US012615161B2

(12) United States Patent
Chun et al.

(10) Patent No.: US 12,615,161 B2
(45) Date of Patent: Apr. 28, 2026

(54) SYSTEM AND METHOD FOR AUTHORISING THE PRESENTATION OF A DIGITAL ASSET

(71) Applicant: Real Matter Technology Limited, Pak Shek Kok (HK)

(72) Inventors: Daniel Chun, Pak Shek Kok (HK); Ming Lam Ng, Pak Shek Kok (HK)

(73) Assignee: Real Matter Technology Limited, Pak Shek Kok (HK)

( * ) Notice: Subject to any disclaimer, the term of this patent is extended or adjusted under 35 U.S.C. 154(b) by 51 days.

(21) Appl. No.: 18/869,365

(22) PCT Filed: May 26, 2023

(86) PCT No.: PCT/IB2023/055424
§ 371 (c)(1),
(2) Date: Nov. 26, 2024

(87) PCT Pub. No.: WO2023/228147
PCT Pub. Date: Nov. 30, 2023

(65) Prior Publication Data
US 2025/0350473 A1 Nov. 13, 2025

(30) Foreign Application Priority Data

May 27, 2022 (HK) ............................ 32022054274.2

(51) Int. Cl.
*H04L 9/32* (2006.01)
*H04L 9/08* (2006.01)
(52) U.S. Cl.
CPC .......... *H04L 9/3247* (2013.01); *H04L 9/0825* (2013.01)

(58) Field of Classification Search
None
See application file for complete search history.

(56) References Cited

U.S. PATENT DOCUMENTS

| | | | | |
|---|---|---|---|---|
| 11,044,098 | B1 | 6/2021 | Thacker et al. | |
| 11,991,286 | B2 * | 5/2024 | Pacella | ................. H04L 9/0825 |
| | | | (Continued) | |

FOREIGN PATENT DOCUMENTS

| | | | |
|---|---|---|---|
| CN | 107430619 | A | 12/2017 |
| CN | 109040026 | A | 12/2018 |
| | | (Continued) | |

*Primary Examiner* — Trang T Doan
(74) *Attorney, Agent, or Firm* — Hinckley, Allen & Snyder; Stephen Holmes

(57) ABSTRACT

The system includes an authorisation device controlled by a controller of the digital asset and stores an authorisation public/private key pair and a digital asset public/private key pair. The system further includes a digital asset server storing the digital asset, and a digital asset presentation device. The digital asset presentation device stores a digital asset pointer relating to a location of data in a distributed ledger, the data relating to the digital asset including the location of the digital asset on the digital asset server. The authorisation key pair is used to grant authorisation to access the digital asset pointer stored on the digital asset presentation device to locate the digital asset data on the distributed ledger. The digital asset key pair is used to grant authorisation to access the digital asset on the digital asset server for presentation by the digital asset presentation device.

10 Claims, 6 Drawing Sheets

(56) References Cited

U.S. PATENT DOCUMENTS

| | | | |
|---|---|---|---|
| 2007/0130127 | A1 | 6/2007 | Passmore et al. |
| 2008/0209514 | A1 | 8/2008 | L'Heureux et al. |
| 2017/0116693 | A1 | 4/2017 | Rae et al. |
| 2020/0084045 | A1* | 3/2020 | Cohen ..................... H04L 9/14 |
| 2022/0278851 | A1* | 9/2022 | Gilson ................. H04L 9/0894 |
| 2022/0405765 | A1* | 12/2022 | Bekiyants .......... H04L 63/0861 |
| 2023/0086191 | A1* | 3/2023 | Jakobsson ............. H04L 9/3231 |
| | | | 705/66 |

FOREIGN PATENT DOCUMENTS

| | | | |
|---|---|---|---|
| CN | 110266683 | A | 9/2019 |
| CN | 110929231 | A | 3/2020 |
| CN | 114255035 | A | 3/2022 |

* cited by examiner

100

<u>103</u>

<u>104</u>

116 Network Interface

117 Processor

119 Battery Source

120 I/O Devices

121 Biometric Input Device

118 Memory

122 Key Pair Generator

124 Authorisation Module

<u>125</u>

127 Header

<u>128</u>
Data List

126

SYSTEM AND METHOD FOR AUTHORISING THE PRESENTATION OF A DIGITAL ASSET

TECHNICAL FIELD

The present invention relates to a system and method for authorising the presentation of a digital asset.

BACKGROUND OF THE INVENTION

A collectible is an item that is typically limited in supply and is sought after by one or more collectors for sentimental and/or investment purposes. This alternative asset class represents an enormous worldwide market and comprises countless items including art, toys, classic cars, wine, whisky, stamps, coins, and any other item that is perceived as rare and has properties that are valued by collectors. Since the value of a collectible is dependent on its originality, the ability to prove the ownership and provenance of an item is important for sale and valuation purposes. Consequently, art houses and other organisations that operate marketplaces for collectibles spend time and effort in researching the provenance of the items offered for sale on their platforms to reassure potential purchasers that an item is original and is legally owned by the seller.

Proof of provenance and ownership may take different forms and traditionally has been in the form of a certificate of authenticity (COA) that includes details relevant to the subject work in support of its provenance. A valid COA for an artwork, for example, may include specific details about the artwork such as the date and place of production, the author/artist, the owner, the dimensions of the art, and the details of authoritative publications that refer to the work. However, even COAs are subject to abuse and can be similarly faked by sophisticated forgers.

More recently, the emergence of blockchain technology has facilitated the ability to demonstrate the ownership and provenance of collectibles in the form of digital representations of physical assets or digital audio and/or visual works that are stored as image, audio, or video files. A blockchain is a history of data deposits, messages, or transactions that are recorded in a series of blocks and maintained by a distributed network of computing devices. In one example, a new block of information may be added to the chain by a computing device of the network after the expenditure of computational effort to solve a computationally expensive problem, or, in another example, the staking of collateral for the chance to validate the new block, in return for a financial reward. Due to the nature of the reward mechanism, participants are incentivised to act in good faith for the benefit of the network and the security of the data stored in the blockchain. For a highly decentralised blockchain with a large number of participants, such as the Bitcoin blockchain, it is extremely difficult for the data stored in the blockchain to be changed or tampered with.

Accordingly, since a blockchain is effectively immutable, it gives certainty to third parties that the data stored by the blockchain is genuine and has not been changed without valid authorisation. Consequently, blockchain technology and, more broadly, distributed ledger technology, provides an excellent platform for proving the ownership and provenance of collectibles by associating a collectible with a so-called non-fungible token or "NFT" that is stored on the blockchain. An NFT is associated with a unique ID so that one NFT can be distinguished from another NFT on the same blockchain. Each NFT can include unique metadata that is associated with a particular digital collectible such as the collectible name, creator, owner, date of production and a URL of the digital file of the collectible such as an image, audio, or video, file. The collectible may be digital in nature, such as a computer-generated image or video, or it may be a digital representation of a physical collectible such as a photograph of a painting.

A problem with digital media is that it is inherently easily copied and reproduced. Therefore, notwithstanding the ability of the owner of a collectible to prove their ownership and the provenance using blockchain technology, a third party with a copy of the digital file representing the collectible may reproduce the digital media and falsely claim to be the creator or owner of the collectible, or their authorised representative. Accordingly, there is a need to provide greater certainty to collectors that, when they are presented with a digital asset or a digital representation of a physical asset, they are dealing with the authentic creator or owner of one or more collectibles, or their authorised representative.

The invention aims to address this problem.

SUMMARY OF THE INVENTION

In accordance with a first aspect of the present invention, there is provided a method of authorising the presentation of a digital asset stored on a digital asset server comprising the steps of:

transmitting, upon authorisation, at a digital asset presentation device, a digital asset data request via a data communication network to a ledger distributed across multiple computing devices and storing data relating to the digital asset including the storage location of the digital asset on the digital asset server, said digital asset data request including a unique pointer for locating the data relating to the digital asset stored on the ledger;

receiving, at the digital asset presentation device, digital asset data from the ledger via the data communication network, said digital asset data including the storage location of the digital asset on the digital asset server;

transmitting, at the digital asset presentation device, a digital asset request to the digital asset server via the data communication network, said digital asset request including the storage location of the digital asset on the digital asset server;

receiving, at the digital asset server, the digital asset request and initiating an operation to obtain authorisation from a controller of the digital asset to serve the digital asset;

upon authorisation, transmitting, at the digital asset server, the digital asset to the digital asset presentation device via the data communication network;

receiving, at the digital asset presentation device, the digital asset from the digital asset server; and rendering, at the digital asset presentation device, the digital asset for presentation purposes;

wherein the transmission of the digital asset data request, at the digital asset presentation device, is authorised by a first signed authorisation message transmitted by an authorisation device, the first signed authorisation message being signed by an authorisation private key of an authorisation key pair stored on the authorisation device and controlled by a controller of the digital asset; and wherein the transmission of the digital asset, at the digital asset server, is authorised by a second signed authorisation message transmitted by the authorisation device, the second signed authorisation message being signed by a digital asset private key of a digital asset key pair stored on the authorisation device and associated with the digital asset and controlled by the controller of the digital asset.

Advantageously, by storing the authorisation private key and the digital asset private key on the authorisation device and allowing authorisation to present a digital asset only upon transmission by the authorisation device of the first and second signed authorisation messages, the controller of the digital asset may prove ownership or authorised control of a digital asset without revealing access credentials. Accordingly, third parties may be reassured that the presentation of a digital asset is by the owner of a digital asset or with the owner's consent.

Multiple digital assets may be stored on the digital asset server and data relating to each digital asset may be stored on the ledger and the method may further comprise the step of selecting, at the digital asset presentation device, the unique pointer of the digital asset to be presented prior to transmitting a digital asset data request via a data communication network to the ledger.

Each digital asset may be associated with a unique digital asset key pair stored on the authorisation device, and the second digitally signed authorisation message may be signed by the digital asset private key of the digital asset key pair associated with the digital asset selected for presentation purposes.

The transmission, at the authorisation device, of the first signed authorisation message and/or the second signed authorisation message may be initiated by the input into the authorisation device of biometric data of the controller and/or private information known to the controller.

The method may further comprise the step of providing the authorisation public key and/or the digital asset public key to the digital asset presentation device and/or the digital asset server for verification of the first signed authorisation message and/or the second signed authorisation message prior to the transmission, at the authorisation device, of the first signed authorisation message and/or the second signed authorisation message.

The method may further comprise the step of generating, at the authorisation device, a digital asset key pair to be associated with a digital asset stored on the digital asset server.

The method may further comprise the steps of generating, at the authorisation device, a unique pointer to be associated with a digital asset stored on the digital asset server and providing the unique pointer to the digital asset presentation device via the data connection.

The method may further comprise the step of writing data relating to the or each digital asset to the ledger.

The or each unique pointer may be securely stored on the digital asset presentation device and the method may comprise the additional step of providing, upon authorisation, at the digital asset presentation device, access to the or each unique pointer for inclusion in the transmission of a digital asset data request.

In accordance with a second aspect of the present invention there is provided a system for authorising the presentation of a digital asset stored on a digital asset server, the system comprising an authorisation device controlled by a controller of the digital asset and storing an authorisation key pair and a digital asset key pair, the authorisation key pair comprising an authorisation public key and an authorisation private key and the digital asset key pair comprising a digital asset public key and a digital asset private key, the system further comprising a digital asset server storing the digital asset at a location, and a digital asset presentation device storing a digital asset pointer relating to a location in a ledger distributed across multiple computing devices of data relating to the digital asset including the location of the digital asset on the digital asset server, the digital asset presentation device, digital asset server and ledger being communicatively coupled via a data communication network, the authorisation device and the digital asset presentation device being communicatively coupled via a data connection, wherein the authorisation device is operable to transmit a first signed authorisation message signed by the authorisation private key to the digital asset presentation device to allow access to the digital asset pointer for retrieval from the ledger of the location of the digital asset on the digital asset server, and wherein the authorisation device is operable to transmit a second signed authorisation message signed by the digital asset private key of the digital asset key pair stored on the authorisation device and associated with the digital asset to authorise the digital asset server to transmit the digital asset to the digital asset presentation device for presentation purposes.

The authorisation device may comprise one or more buttons and/or a touchscreen and/or a biometric data input device for the input of biometric data of the controller of the authorisation device and/or private information known to the controller.

The digital asset presentation device may be operable to transmit a digital asset data request to the ledger to obtain the location of the digital asset on the digital asset server, said digital asset data request including the digital asset pointer.

The digital asset server may store multiple digital assets and data relating to each digital asset may be stored on the ledger, and the digital asset presentation device may be operable to permit selection of the unique pointer of the digital asset to be presented prior to transmitting a digital asset data request via the data communication network to the ledger.

Each digital asset may be associated with a unique digital asset key pair stored on the authorisation device, and the authorisation device may be configured to sign the second authorisation message with the digital asset private key of the digital asset key pair associated with the digital asset selected for presentation purposes.

The authorisation device may be configured to generate a digital asset key pair to be associated with a digital asset stored on the digital asset server.

The digital asset presentation device may be configured to generate the unique pointer to be associated with a digital asset stored on the digital asset server.

The digital asset presentation device may be configured to write data relating to the or each digital asset to the ledger.

The digital asset presentation device may securely store the or each unique pointer and may be configured, upon receipt of the first signed authorisation message, to allow access to the or each unique pointer for inclusion in the transmission of a digital asset data request to the ledger.

In accordance with a third aspect of the present invention, there is provided a method of controlling a system to authorise the presentation of a digital asset, the system comprising an authorisation device controlled by a controller of the digital asset and storing an authorisation key pair and a digital asset key pair, the authorisation key pair comprising an authorisation public key and an authorisation private key and the digital asset key pair comprising a digital asset public key and a digital asset private key, the system further comprising a digital asset server storing the digital asset, and a digital asset presentation device storing the authorisation public key and a digital asset pointer relating to a location in a ledger distributed across multiple computing devices of data related to the digital asset including the digital asset public key and the location of the digital asset on the digital asset server, the digital asset presentation device, digital asset server and ledger being communicatively coupled via a data communication network, the authorisation device and the digital asset presentation device being communicatively coupled via a data connection, the method comprising the steps of:

transmitting, at the authorisation device, a digital asset pointer release authorisation message signed by the authorisation private key to the digital asset presentation device via the data connection, said transmission of the digital asset pointer release authorisation message initiated by the controller;

receiving, at the digital asset presentation device, the digital asset pointer release authorisation message via the data connection and verifying the digital asset pointer release authorisation message based on the authorisation public key;

upon verification of the digital asset pointer release authorisation message, transmitting, at the digital asset presentation device, a request to the ledger for the digital asset public key and the location of the digital asset on the digital asset server, the request to the ledger including the digital asset pointer to the location in the ledger of the data relating to the digital asset;

receiving, at the digital asset presentation device, the digital asset public key and the location of the digital asset on the digital asset server from the ledger via the data communication network;

transmitting, at the digital asset presentation device, a request to the digital asset server for the digital asset via the data communication network, the request to the digital asset server including the location of the digital asset on the digital asset server and the digital asset public key;

receiving, at the digital asset server, the request for the digital asset and, in response, transmitting an authorisation request to the digital asset presentation device via the data communication network;

receiving, at the digital asset presentation device, the authorisation request via the data communication network and, upon receipt, transmitting the authorisation request to the authorisation device via the data connection;

transmitting, by the digital asset presentation device and the authorisation device, to the digital asset server via the data communication network a digital asset presentation authorisation message signed by the digital asset private key, said transmission of the digital asset presentation authorisation message initiated by the controller;

receiving, at the digital asset server, the signed digital asset presentation authorisation message and verifying the digital asset presentation authorisation message based on the digital asset public key, upon verification of the signed digital asset presentation authorisation message, transmitting, at the digital asset server, the digital asset to the digital presentation device via the data communication network; and receiving, at the digital asset presentation device, the digital asset via the data communication network and rendering the digital asset for presentation purposes.

In accordance with a fourth aspect of the present invention there is provided an authorisation device configured for use in the system according to the second aspect of the present invention, or to implement part of a method according to the first or third aspects of the present invention.

DESCRIPTION OF THE DRAWINGS

In order that the invention may be more clearly understood, one embodiment thereof will now be described, by way of example, with reference to the accompanying drawings in which.

DETAILED DESCRIPTION

Figure 1:
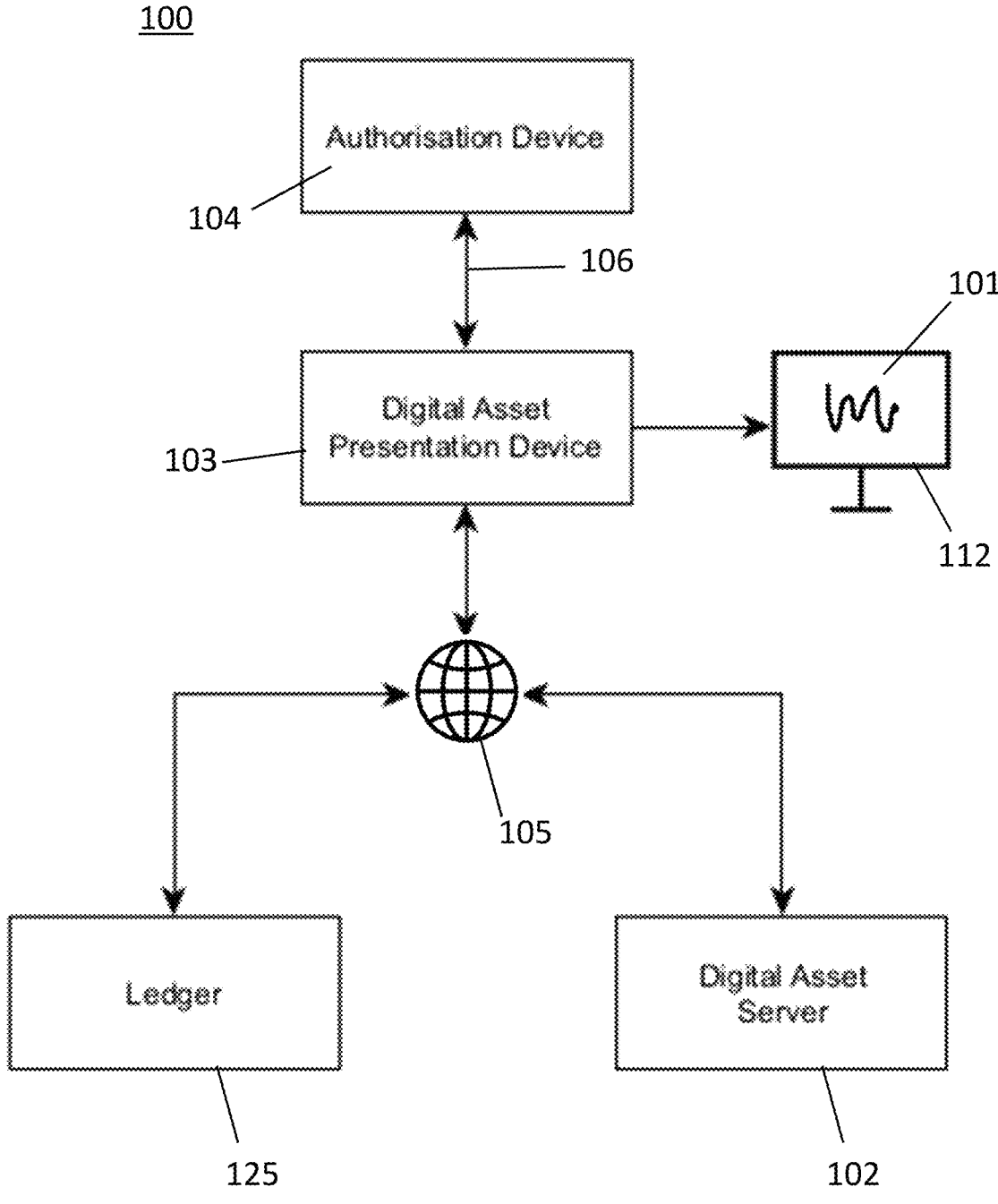
FIG. 1 shows a schematic representation of an example of a system in accordance with embodiments.

Referring to FIG. 1, there is shown schematically a system 100 for authorising the presentation of a digital asset 101 by a controller of the digital asset 101 such as the owner or creator of the digital asset 101 or the owner or creator's authorised representative. The term "digital asset" will be used to refer to both a computer file storing a digital collectible and the rendered content of the digital collectible such as a digitally generated work of art, photograph, video content or audio content, or a digital representation of a physical collectible such as photograph of a painting, sculpture, or bottle of wine.

The system 100 comprises a digital asset server 102, a digital asset presentation device 103, and an authorisation device 104. The digital asset server 102 and the digital asset presentation device 103 are communicatively coupled via a data communication network 105. In the present example, the data communication network 105 is the Internet but may additionally, or alternatively, comprise one or more other networks. The digital asset presentation device 103 and the authorisation device 104 are communicatively coupled via a data connection 106. The data connection 106 may be a wired and/or wireless connection. The wireless connection may be a direct connection using near-field communication (NFC) or Bluetooth® protocols or an indirect connection via a wireless network to which both devices are connected.

The digital asset server 102 comprises one or more physical and/or virtual resources and is embodied in hardware and/or software. In the present example, the digital asset server 102 is a webserver having a memory storing one or more digital assets 101, each at a unique storage location specified by a corresponding Unique Resource Identifier (URI) in the form of a Uniform Resource Locator (URL). The digital asset server 102 also stores a digital asset database in memory with a list of all stored digital assets 101, associated digital asset metadata and the corresponding URL.

Figure 2:
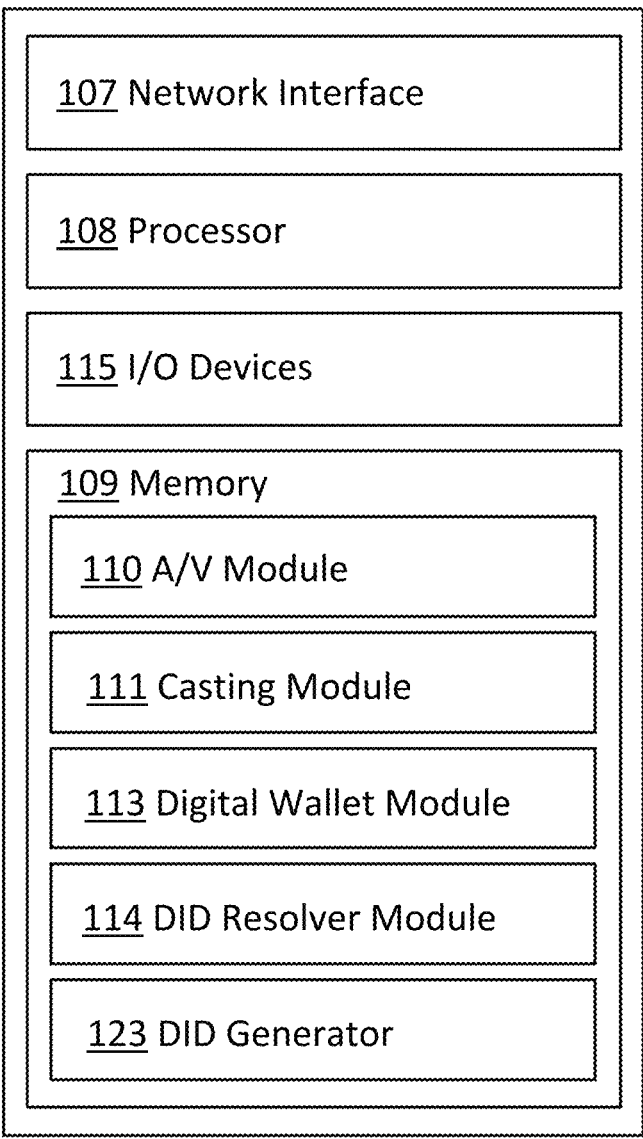
FIG. 2 shows a schematic representation of an example of a digital asset presentation device in accordance with embodiments.

Referring to FIG. 2, the digital asset presentation device 103 is a computing device such as a smartphone, laptop computer, tablet computer, digital set-top device, smart TV, or any other computing device capable of connecting to the data communication network 105 and running one or more software applications. The digital asset presentation device 103 comprises a network interface 107 comprising a wired and/or wireless interface for connecting the digital asset presentation device 103 to the data communication network 105. The digital asset presentation device 103 also comprises a processor 108 and memory 109 for storing instructions as modules executable by the processor 108.

In this example, the memory 109 stores an audio/visual module 110 for rendering content of the digital asset 101, a casting module 111 for casting the rendered content to a remote presentation device 112 such as a television and/or loudspeaker, a digital wallet module 113 for storing one or more unique pointers to data relating to one or more digital assets 101 stored in a remote location accessible via the data communication network 105, a DID generator module 123 for generating a unique DID to be associated with a digital asset 101, and a decentralised identifier (DID) resolver module 114 for resolving a DID associated with a digital asset 102.

In this example, the digital asset presentation device 103 comprises one or more input/output devices 115 for interaction by a user with the digital asset presentation device 103. The one or more input/output devices 115 may comprise a display with touchscreen capability, a loudspeaker, a keyboard and/or a remote-control device to facilitate interaction between a user and the digital asset presentation device 103. Since the digital asset presentation device 103 may comprise a display and/or loudspeaker, it will be appreciated that the digital asset presentation device 103 may be configured to present the rendered content directly to the user without the need to cast the rendered content to a remote presentation device 112. For example, if the digital asset presentation device 103 is a smartphone, personal computer, or television, the rendered content may be presented directly to the user via the display and/or loudspeaker of the digital presentation device 103.

It will be appreciated that the digital asset presentation device 103 may comprise more, fewer and/or different components from those described and depicted.

Figure 3:
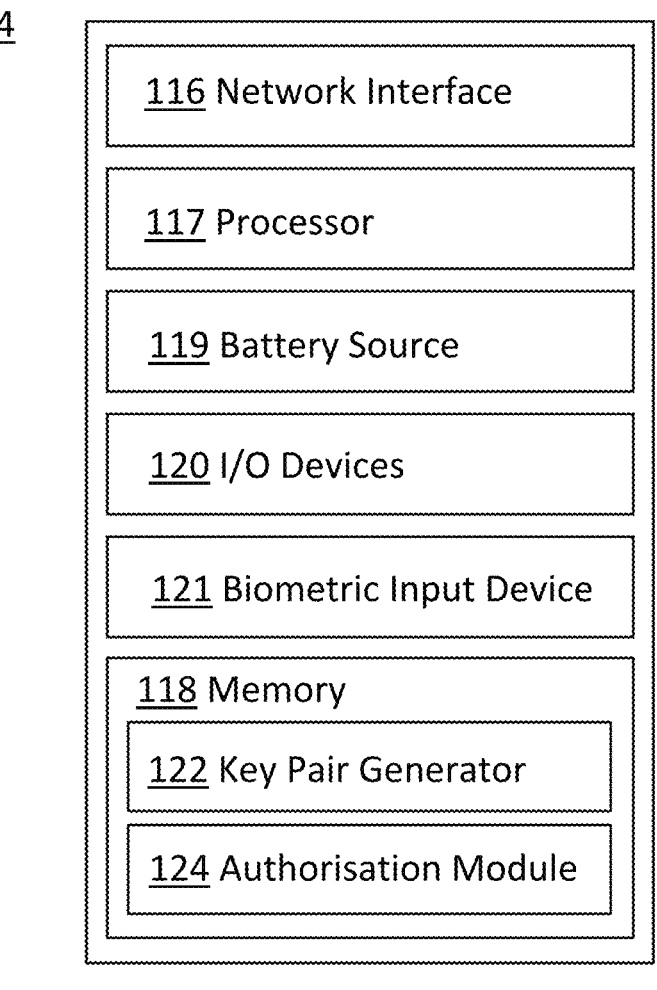
FIG. 3 shows a schematic representation of an example of an authorisation device in accordance with embodiments.

Referring to FIG. 3, the authorisation device 104 comprises a network interface 116 comprising a wired and/or wireless interface for connecting the authorisation device 104 to the digital asset presentation device 103. The wireless interface may be configured to transmit and receive wireless signals using near-field communication (NFC) or Bluetooth® protocols or to connect to a wireless network to which the digital asset presentation device 103 is also connected. The authorisation device 104 further comprises a processor 117, memory 118 storing instructions as modules executable by the processor 117, a battery source 119 for device portability, one or more input/output devices 120 in the form of one or more buttons and/or a screen, and a biometric data input device 121 for the input of biometric data such as a fingerprint or iris scan of a user of the authorisation device 103.

The authorisation modules include a digital key pair generator 122 for generating one or more cryptographic key pairs comprising a digital private key and a digital public key, and an authorisation module 124 for digitally signing one or more authorisation messages by a digital private key of a key pair for transmission to one or more remote devices for authorisation purposes. In the present example, the authorisation module 124 is configured to implement the Elliptic Curve Digital Signature Algorithm (ECDSA) but it will be appreciated other signing methods may be implemented such as the Digital Signature Algorithm (DSA).

In this example, as shown in FIG. 1, the system 100 further comprises a distributed ledger 125 communicatively coupled to the digital asset server 102 and the digital asset presentation device 103 via the data communication network 105. The distributed ledger 125 stores data across multiple computing devices that are each connected via the data communication network 105 and secured by blockchain technology.

Figure 4:
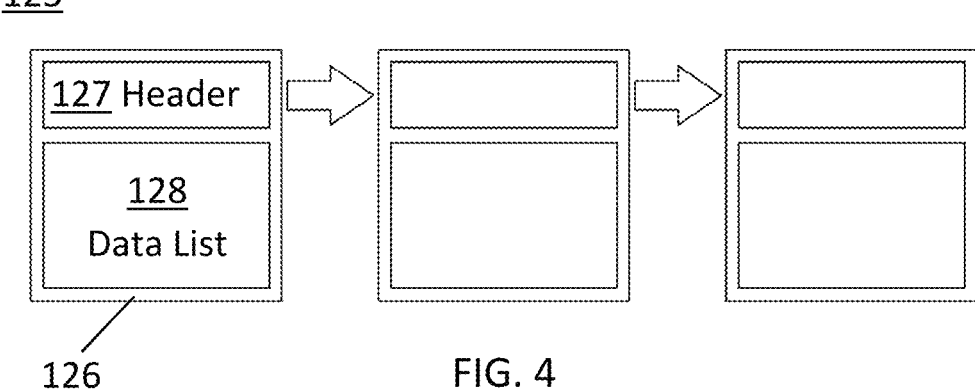
FIG. 4 shows a schematic representation of part of a blockchain of a distributed ledger.

Referring to FIG. 4, the distributed ledger 125 comprises one or more "blocks" 126 that are sequentially created and linked together to form an immutable, historical record of information stored as data in the blocks 126. In the present example, each block 126 comprises a block header 127 and a data list 128 in which information related to one or more digital assets 101 may be stored. Each block 126 has a block identifier to allow a particular block storing desired data relating to a digital asset 102 to be located. The block identifier may be the block height of a particular block i.e., the number of blocks up to and including the particular block in the blockchain, or the block hash number which is obtained by hashing the block header twice with the SHA256 algorithm.

The system 100 is configured to permit the owner/creator of the digital assets 101, or their authorised representative, hereinafter referred to as the "controller", to authorise the presentation of securely stored digital assets 101 by the digital asset presentation device 103. Authorisation is granted by the controller using the authorisation device 104. The authorisation device 104 is locked to the controller using biometric data of the controller captured via the biometric data input device 121 and/or private information known to the controller such as a pin or password entered via the input/output devices 120. Accordingly, only a controller can unlock the authorisation device 104 to implement authorisation actions in relation to the presentation of digital assets 101.

Authorisation to initiate the presentation of a digital asset 101 by the digital asset presentation device 103 is granted by the authorisation device 104 using a first security key pair which is generated by the key pair generator 122 upon initial configuration of the authorisation device 104. The first security key pair or "authorisation" key pair comprises a digital authorisation private key and a digital authorisation public key which are securely stored in the memory 118 of the authorisation device 104. The digital asset presentation device 103 may be paired with the authorisation device 104 by initiating a pairing procedure via the data connection 106. Upon successful pairing, the authorisation device 104 transmits the public authorisation key to the digital asset presentation device 103 for storage in memory 109 for subsequent authentication purposes by the digital asset presentation device 103.

One or more authorisation messages for initiating the presentation of a digital asset may be transmitted to the digital asset presentation device 103 by the authorisation device 104 via the data connection 106. An authorisation message must be digitally or 'cryptographically' signed by the authorisation private key to be validated and implemented by the digital wallet module 113 of the digital asset presentation device 103. The generation, signing and transmission of an authorisation message is implemented, with the approval of the controller, by the authorisation module 124 in response to an authorisation request or "challenge" from the digital asset presentation device 103. The validity of a digitally signed authorisation message may be verified by the receiving device using the authorisation public key and known decryption techniques. Accordingly, the digital asset presentation device 103 may use the authorisation public key to validate a digitally signed authorisation message from the authorisation device 104 so that a user of the digital asset presentation device 103 may initiate the procedure for presenting a secured digital asset 101.

Figure 5:
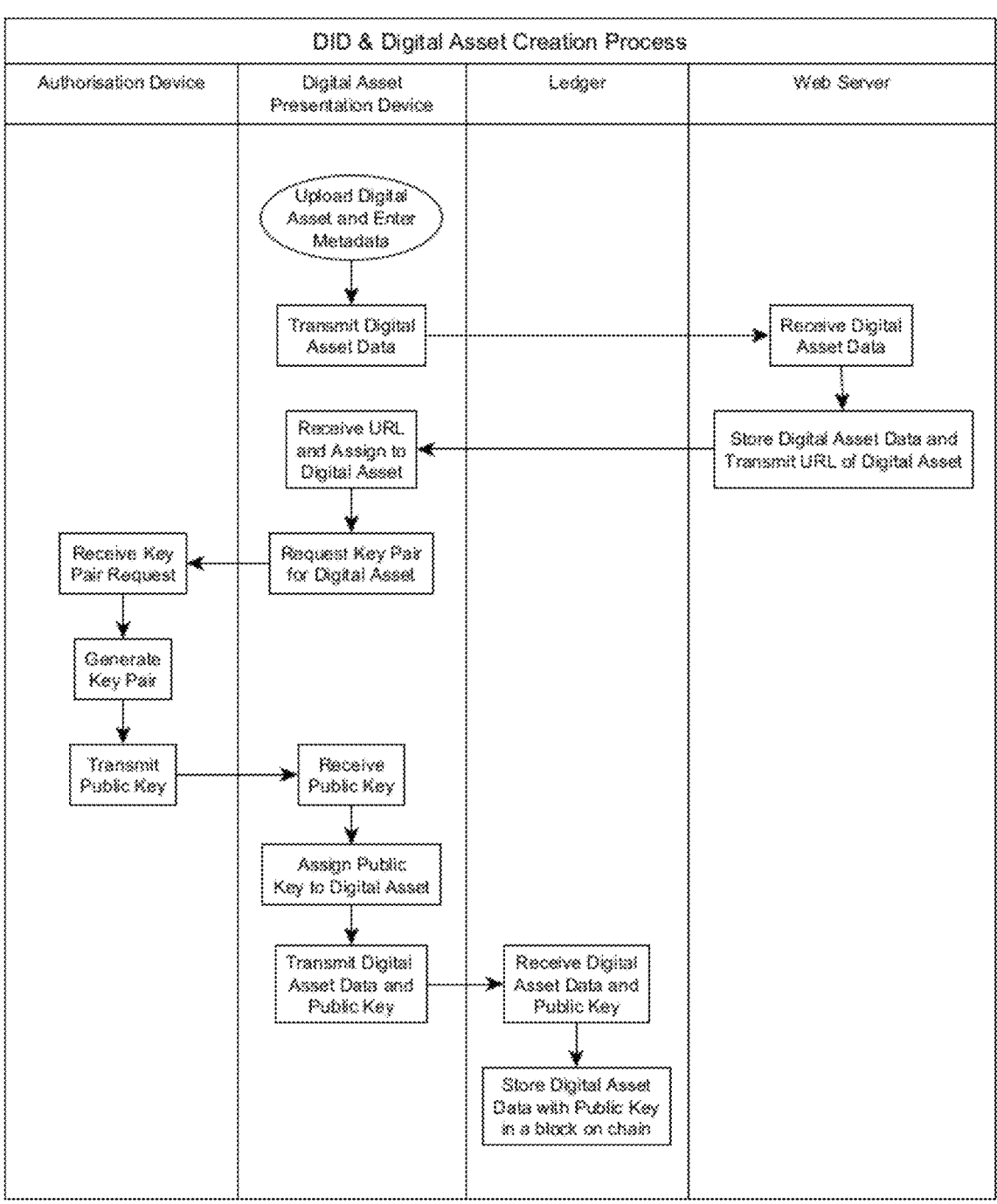
FIG. 5 shows a swim lane flowchart depicting an example procedure for uploading a digital asset to a server and generating a security key pair to be associated with a digital asset.

Referring to FIG. 5, in this example, one or more digital assets 101 may be securely stored for future presentation by uploading the digital asset 101 to the digital asset server 102. The digital asset 101 is uploaded to the digital asset server 102 by the digital asset presentation device 103 via a web page served by the digital asset server 102 over the data communication network 105. The web page includes one or more fields for entering metadata related to the digital asset 101 such as the title of the work, the author/artist, date, and time of creation of the work, and the registered owner. It will be appreciated that the digital asset presentation device 103 may alternatively or additionally store a software application or 'app' in memory 109 which is operable to connect to the digital asset server 102 and allow the uploading of a digital asset 101 and the corresponding metadata to the server 102.

Upon receipt of the digital asset 101, the digital asset server 102 stores the digital asset 101 at a location in memory specified by a URL and saves the metadata relating to the digital asset in the digital asset database stored in memory along with the URL. The digital asset server 102 transmits the URL back to the digital asset presentation device 103 via the data communication network 105 for storage in a digital asset database in the memory 109 together with identification data of the digital asset 101. Upon receipt and storage of the digital asset URL in memory 109, the digital asset presentation device 103 transmits a request to the authorisation device 103 via the data connection 106 to generate a second key pair to be associated with the digital asset 101.

Upon receipt of the second key pair request, the authorisation device 104 prompts the controller for permission to generate the key pair via the input/output devices 120. Permission may be given by the controller by selecting an "approve" action using the buttons and screen. When permission is granted, the key pair generator 122 generates the second security key pair or "digital asset" key pair comprising a digital asset private key and a digital asset public key and transmits the digital asset public key to the digital asset presentation device 103.

Upon receipt of the digital asset public key by the digital asset presentation device 103, the digital wallet module 113 associates the digital asset public key with the digital asset 101 and stores the digital asset public key in memory 109. The digital wallet module 113 generates and transmits a request to the ledger 125 via the data communication network 105 to write data relating to the digital asset 101 in a block of the ledger 125 blockchain. The data relating to the digital asset 101 includes metadata such as the owner of the digital asset 101, date and time of creation, creator/author, URL location of the digital asset 101 on the digital asset server 102, and a wallet address or blockchain address of the digital asset 101 in the form of a hash of the digital asset public key associated with the digital asset 101. The blockchain address represents a unique pointer that may be used to locate the metadata of a desired digital asset 101 in a block on the blockchain of the selected ledger 125 so that the digital asset URL can be obtained for presentation purposes. Depending on the chosen ledger 125 and the corresponding blockchain storage capabilities, the ledger 125 may include the data in a block directly on the main chain or may write the majority of the data to a second framework or protocol known as a "layer 2" chain with higher data storage capacity. In this latter case, the ledger 125 may include data on the main chain with information for locating the corresponding layer 2 data for retrieval purposes.

The digital wallet module 113 is configured to allow the preferred ledger 125 to be selected when uploading and writing digital asset related metadata to the blockchain. For example, the digital wallet module 113 may permit selection of multiple different ledgers 125 such as Ethereum, Veres One, Sovrin, Bitcoin, or any other suitable ledger 125. Depending on the choice of ledger 125, a payment in the form of a cryptocurrency of the chosen ledger 125 may be required to write the digital asset data to the ledger 125. Accordingly, in the present example, the digital wallet module 113 is configured to hold a balance in the cryptocurrencies of the various ledger 125 options to permit transacting with the selected ledger 125 and writing of digital asset data to the ledger 125.

Upon writing of the digital asset data to the ledger 125, the ledger 125 transmits a response to the digital asset presentation device 103 with the block number of the block in which the digital asset data has been added, the block hash number, and the transaction hash of the digital asset data included on chain. Upon receipt of the response at the digital asset presentation device 103, the digital wallet module 113 processes the response and stores the block hash number and transaction hash in the digital asset database alongside the corresponding digital asset data.

As shown in FIG. 3, the digital asset presentation device 103 also comprises a DID generator module 123 for generating a so-called "decentralised identifier" to be associated with a digital asset 101 and which may be used instead of, or in addition to, the blockchain addresses for locating and retrieving on-chain digital asset related metadata. A decentralised identifier or "DID" is a text string that conforms to the generic DID URI scheme standard and is a simple URI that can be used to uniquely identify a subject, such as a digital asset 101, and to obtain digital asset related metadata stored on-chain. The DID text string comprises three parts, namely the DID URI scheme identifier "did:", the identifier for the chosen DID method, and the DID method specific identifier. For supported ledgers 125, the DID can be used to generate a DID document that is stored on the ledger 125 or on an associated off-chain ledger/document and which contains various metadata about the digital collectible such as the digital asset URL and other related data as detailed above.

Figure 6:
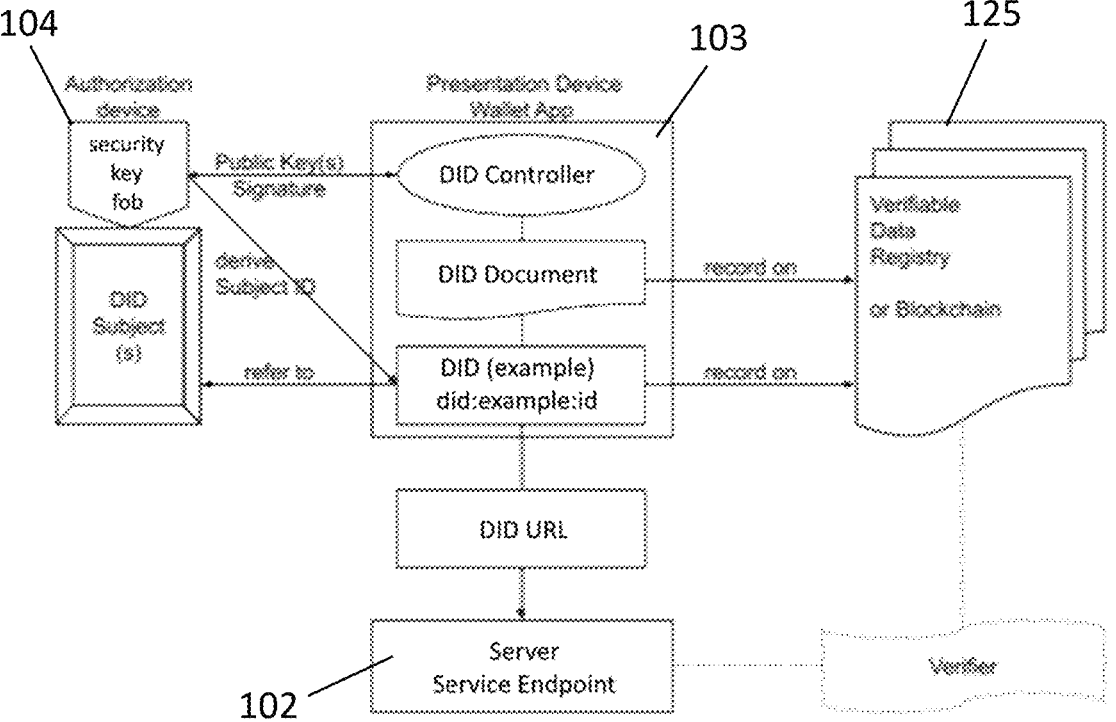
FIG. 6 shows an overview of the creation by a DID controller of a DID and DID document relating to a DID subject.

The DID and DID document creation procedure varies by DID method and depends on whether the ledger 125 in question has native support for DIDs and DID documents. In general, though, data related to the subject is written to a block of the chosen ledger 125, and an off-chain resource if not natively supported on the main chain, and the DID method specific identifier is generated with a unique pointer toward the relevant on-chain transaction in which the data is stored. For example, with reference to FIG. 6, a DID and corresponding DID document may be generated by an authorised user (the "DID controller") of the digital asset presentation device 103 through implementation by the DID generator 123 of the DID method of the selected ledger 125, such as the BTCR method for the Bitcoin ledger, and writing the digital asset or "DID subject" related data to both the blockchain ledger and, if necessary, an off-chain document with higher storage capacity whose location is specified by a URL. In the example of the Bitcoin ledger, digital asset related metadata is written to the off-chain document and a URL pointer to the off-chain document is written to a block of the main Bitcoin chain in the transaction data. The DID is then constructed by the DID generator 123 by adding the did: scheme identifier to the BTCR DID method and DID method specific identifier which, in the case of the BTCR method, is an encoding of the Bitcoin network, block height, and block position (transaction hash) of the block containing the URL pointer. Accordingly, in one example, a Bitcoin DID may take the form "did:btcr:xkyt-fzgq-qq87-xnhn". The DID may be subsequently resolved by the DID resolver module 114 of the digital asset presentation device 103 to construct the corresponding DID document and thereby obtain the digital asset URL with which to query the digital asset server 102 for presentation purposes.

If the selected ledger 125 natively supports DIDs and DID documents, such as in the case of the Veres One blockchain, both the DID and the DID document may be written directly to a block of the ledger 125 by the DID generator 123. In this example, the DID document can be more easily obtained by the DID resolver module 114 by using the DID to obtain the DID document directly from the ledger 125 and obtain the digital asset URL and digital asset metadata for verification purposes.

It will be appreciated that other blockchains with DID and DID document support may implement different methods for the generation and storage of DIDs and DID documents, and their resolution. In each case, though, as with the blockchain address, the DID provides a unique pointer to a location in the ledger 125 from which a DID document can be obtained for the extraction of the digital asset related metadata. Upon generation of a DID by the DID generator module 123, the digital asset presentation device 103 stores the DID in memory 109 in association with the related digital asset 101 for subsequent metadata retrieval from the ledger 125.

Figure 7:
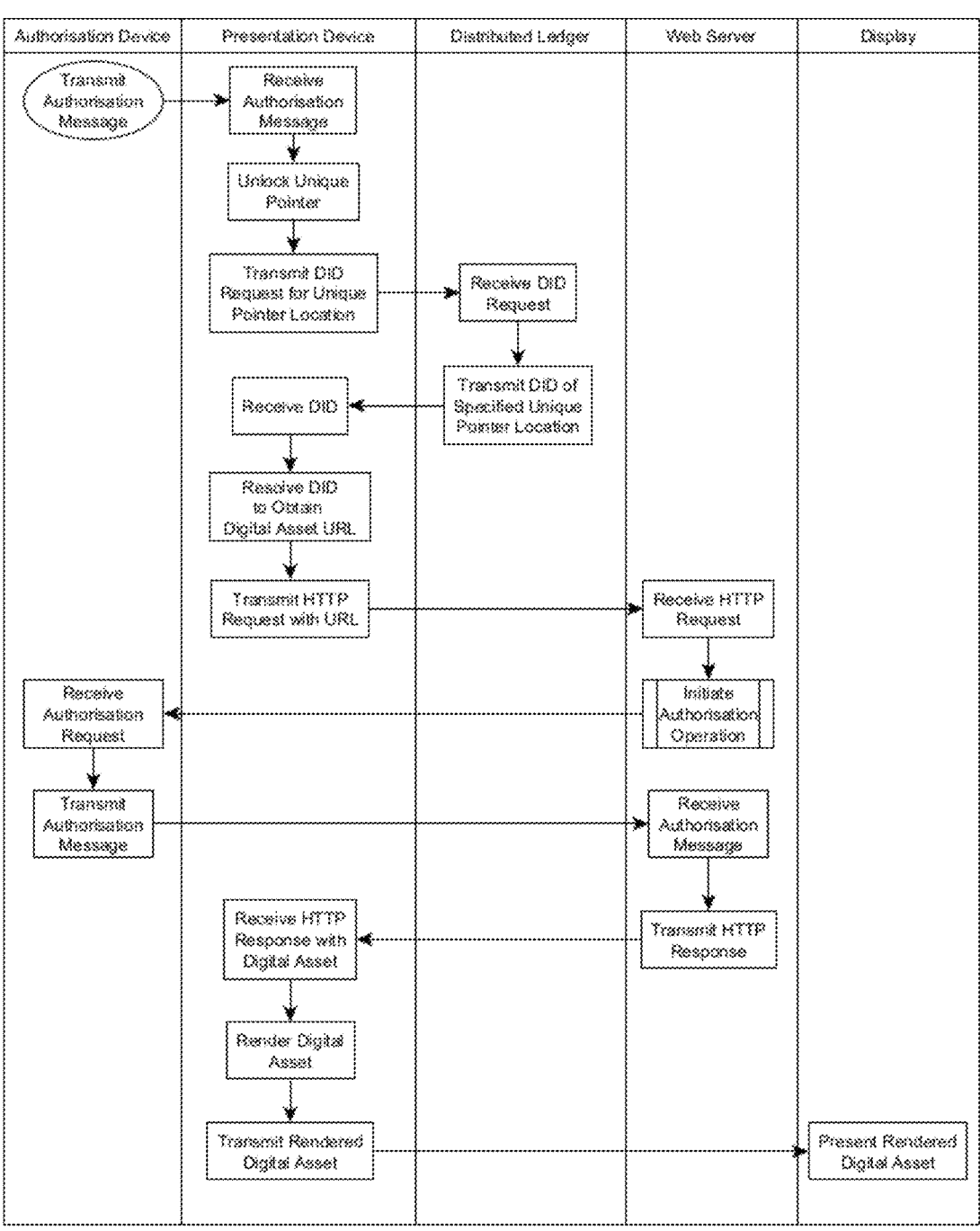
FIG. 7 shows a swim lane flowchart depicting an example procedure for authorising the presentation of a digital asset stored on a digital asset server.

The above procedures may be repeated each time a new digital asset 101 is created and uploaded to the digital asset server 102 so that a digital asset key pair and unique pointer in the form of a blockchain address and/or DID is associated with each digital asset 101 and stored in memory 109 by the digital wallet module 113 of the digital asset presentation device 103. Since the unique pointers are secured by the digital wallet module 113, access to the unique pointers to initiate a presentation procedure for authorising the presentation of a digital asset 101 may only be initiated by a validly signed authorisation message from the authorisation device 104. Referring to FIG. 7, a digital asset presentation procedure may be initiated by a user of the digital asset presentation device 103. In a first step, a user of the digital asset presentation device 103 initiates the transmission to the authorisation device 104 of a request to access the unique pointers of the digital assets 101 of the controller that are stored on the digital asset presentation device 103. If approved, the controller unlocks the authorisation device 104 by inputting their biometric data and/or private access credentials and selects an approve operation via the input/output devices 120. The authorisation module 124 signs an authorisation message using the authorisation private key and transmits the authorisation message to the digital presentation device 103 via the data connection 106.

In a second step, upon receipt of the authorisation message, the digital asset presentation device 103 validates the authorisation message using the authorisation public key and unlocks the digital wallet module 113 for user control. The digital wallet module 113 is configured to list the digital assets 101 of the controller in alphanumeric order and to default to the first digital asset 101 in the list for presentation purposes. The digital wallet module 113 is further configured to allow user input to alter the default first selected digital asset for example to the most recently presented digital asset 101 or first-in-first out method. The user may scroll through the various digital assets 101 of the controller using the input/output devices 115 to locate the desired digital asset of interest. To facilitate the user in locating the desired digital asset 101 to be presented, the digital asset database may store a local cache with thumbnails of recently viewed digital assets for visual selection. The local cache may be configured to clear periodically according to a pre-set timeout or date out for privacy purposes.

When the user has identified the digital asset 101 of interest, the digital wallet module 113 may be instructed to initiate a digital presentation request e.g., by selecting a virtual "present" button. Upon initiation of the digital presentation request, in a third step, the digital wallet module 113 generates and transmits a digital asset data request to the ledger 125 via the data communication network 105. The request includes the one or more unique pointers associated with the digital asset 101 for locating the requested data on-chain. Upon receipt of the digital asset data request, the ledger 125 locates the data based on the unique pointer and returns a response package to the digital asset presentation device 103, including the digital asset URL.

Upon receipt of the response package, the digital wallet module 113 obtains the digital asset URL and transmits a HTTP request to the digital asset server 102 to retrieve the digital asset 101 at the specified digital asset URL. As described above, if the unique pointer is a DID, the DID resolver module 114 resolves the DID to obtain the DID document for extraction of the digital asset URL and transmission of the HTTP request to the digital asset server 102. In a fourth step, the digital asset server 102 initiates an authorisation operation in which an access approval request or challenge is transmitted to the authorisation device 104 via the digital asset presentation device 103 over the data communication network 105 and data connection 106.

Upon receipt of the access approval request, the controller is prompted by the authorisation device 104 to approve the user access to the digital asset 101 on the digital asset server 102. After unlocking the authorisation device 104 in the above-described manner, approval by the controller is input to the authorisation device 104 by selecting the appropriate button via the input/output devices 120. Upon granting of approval by the controller, the authorisation module 124 digitally signs the access authorisation message using the digital asset private key corresponding to the selected digital asset 101 and transmits the access authorisation message to the digital asset server 102 via the digital asset presentation device 103 over the data connection 106 and data communication network 105. To minimise the risk of unauthorised access to the authorisation device 104 and the unauthorised presentation of digital assets 101, an unlocked authorisation device 104 is programmed to automatically lock after five minutes of inactivity.

Upon receipt of the access authorisation message, the digital asset server 102 verifies the message using the digital asset public key and transmits the computing file of the digital asset 101 to the digital asset presentation device 103 for further processing.

Upon receipt of the digital asset 101 by the digital asset presentation device 103, the AV module 110 renders the content for presentation purposes. If the digital asset presentation device 103 has presentation capabilities, the user may choose to directly present the digital asset 101 via the input/output devices 115. If the digital asset presentation device 103 does not have presentation capabilities or the user prefers not to, the casting module 111 may be instructed by the user to cast the rendered content of the digital asset 101 to a remote presentation device 112 for presentation purposes.

Advantageously, by requiring authorisation from the controller to release the digital asset 101 by the digital asset server 102 for presentation of the digital asset 101, third parties that are presented a digital asset by a user of the digital asset presentation device 103 are assured that the digital asset 101 is being presented by or on behalf of the legitimate owner of the digital asset 101. Third parties may also verify the credentials of the digital asset 101 by referring to the related on-chain data.

The above embodiments are described by way of example only. Many variations are possible without departing from the scope of the invention as defined in the appended claims.

The invention claimed is:

1. A method of authorising the presentation of a digital asset stored on a digital asset server comprising the steps of:

transmitting, upon authorisation, at a digital asset presentation device, a digital asset data request via a data communication network to a ledger distributed across multiple computing devices and storing data relating to the digital asset including the storage location of the digital asset on the digital asset server, said digital asset data request including a unique pointer for locating the data relating to the digital asset stored on the ledger;

receiving, at the digital asset presentation device, digital asset data from the ledger via the data communication network, said digital asset data including the storage location of the digital asset on the digital asset server;

transmitting, at the digital asset presentation device, a digital asset request to the digital asset server via the data communication network, said digital asset request including the storage location of the digital asset on the digital asset server;

receiving, at the digital asset server, the digital asset request and initiating an operation to obtain authorisation from a controller of the digital asset to serve the digital asset;

upon authorisation, transmitting, at the digital asset server, the digital asset to the digital asset presentation device via the data communication network;

receiving, at the digital asset presentation device, the digital asset from the digital asset server; and rendering, at the digital asset presentation device, the digital asset for presentation purposes;

wherein the transmission of the digital asset data request, at the digital asset presentation device, is authorised by a first signed authorisation message transmitted by an authorisation device, the first signed authorisation message being signed by an authorisation private key of an authorisation key pair stored on the authorisation device and controlled by a controller of the digital asset; and wherein the transmission of the digital asset, at the digital asset server, is authorised by a second signed authorisation message transmitted by the authorisation device, the second signed authorisation message being signed by a digital asset private key of a digital asset key pair stored on the authorisation device and associated with the digital asset and controlled by the controller of the digital asset.

2. The method as claimed in claim 1, wherein multiple digital assets are stored on the digital asset server and wherein data relating to each digital asset is stored on the ledger and wherein the method further comprises the step of selecting, at the digital asset presentation device, the unique pointer of the digital asset to be presented prior to transmitting a digital asset data request via a data communication network to the ledger.

3. The method as claimed in claim 2, wherein each digital asset is associated with a unique digital asset key pair stored on the authorisation device, and wherein the second signed authorisation message is signed by the digital asset private key of the digital asset key pair associated with the digital asset selected for presentation purposes.

4. The method as claimed in claim 1, wherein the transmission, at the authorisation device, of the first signed authorisation message and/or the second signed authorisation message is initiated by the input into the authorisation device of biometric data of the controller and/or private information known to the controller.

5. The method as claimed in claim 1 further comprising the step of providing the authorisation public key and/or the digital asset public key to the digital asset presentation device and/or the digital asset server for verification of the first signed authorisation message and/or the second signed authorisation message prior to the transmission, at the authorisation device, of the first signed authorisation message and/or the second signed authorisation message.

6. The method as claimed in claim 1, further comprising the step of generating, at the authorisation device, a digital asset key pair to be associated with a digital asset stored on the digital asset server.

7. The method as claimed in claim 1, further comprising the step of generating the unique pointer to be associated with a digital asset stored on the digital asset server.

8. The method as claimed in claim 1, further comprising the step of writing data relating to the or each digital asset to the ledger.

9. The method as claimed in claim 1, wherein the or each unique pointer is securely stored on the digital asset presentation device and wherein the method comprises the additional step of providing, upon authorisation, at the digital asset presentation device, access to the or each unique pointer for inclusion in the transmission of a digital asset data request.

10. A system for authorising the presentation of a digital asset stored on a digital asset server, the system comprising an authorisation device controlled by a controller of the digital asset and storing an authorisation key pair and a digital asset key pair, the authorisation key pair comprising an authorisation public key and an authorisation private key and the digital asset key pair comprising a digital asset public key and a digital asset private key, the system further comprising a digital asset server storing the digital asset at a location, and a digital asset presentation device storing a digital asset pointer relating to a location in a ledger distributed across multiple computing devices of data relating to the digital asset including the location of the digital asset on the digital asset server, the digital asset presentation device, digital asset server and ledger being communicatively coupled via a data communication network, the authorisation device and the digital asset presentation device being communicatively coupled via a data connection, wherein the authorisation device is operable to transmit a first signed authorisation message signed by the authorisation private key to the digital asset presentation device to allow access to the digital asset pointer for retrieval from the ledger of the location of the digital asset on the digital asset server, and wherein the authorisation device is operable to transmit a second signed authorisation message signed by the digital asset private key of the digital asset key pair stored on the authorisation device and associated with the digital asset to authorise the digital asset server to transmit the digital asset to the digital asset presentation device for presentation purposes.

* * * * *